US008509820B2

(12) United States Patent
Aoyagi et al.

(10) Patent No.: US 8,509,820 B2
(45) Date of Patent: Aug. 13, 2013

(54) LOCATION IDENTIFYING METHOD AND LOCATION IDENTIFYING DEVICE

(75) Inventors: Sadanori Aoyagi, Yokosuka (JP); Tomohiro Nagata, Tokyo (JP); Ichiro Okajima, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 96 days.

(21) Appl. No.: 13/380,627

(22) PCT Filed: Jun. 30, 2010

(86) PCT No.: PCT/JP2010/061137
§ 371 (c)(1),
(2), (4) Date: Jan. 30, 2012

(87) PCT Pub. No.: WO2011/002019
PCT Pub. Date: Jan. 6, 2011

(65) Prior Publication Data
US 2012/0122483 A1    May 17, 2012

(30) Foreign Application Priority Data
Jun. 30, 2009  (JP) .................................. 2009-155487

(51) Int. Cl.
*H04W 24/00* (2009.01)
(52) U.S. Cl.
USPC ................... 455/457; 455/404.2; 455/456.1
(58) Field of Classification Search
USPC .............. 455/404.2, 456.1, 457, 9; 705/14.4, 705/14.41–14.45, 14.49, 14.52–14.53, 14.58, 705/14.62–14.64, 14.66–14.69, 14.72–14.73; 348/39, 78, 135, 137, 143, 157, 578, 580, 348/586, 587
See application file for complete search history.

(56) References Cited

U.S. PATENT DOCUMENTS

| | | | | |
|---|---|---|---|---|
| 2007/0214041 A1* | 9/2007 | Patel et al. | ...................... | 705/14 |
| 2009/0157498 A1* | 6/2009 | Seltzer et al. | ................... | 705/14 |
| 2010/0332324 A1* | 12/2010 | Khosravy et al. | .......... | 705/14.53 |
| 2011/0258049 A1* | 10/2011 | Ramer et al. | ............... | 705/14.66 |

FOREIGN PATENT DOCUMENTS
JP    2007 293544    11/2007

OTHER PUBLICATIONS
International Preliminary Report on Patentability Issued Feb. 14, 2012 in PCT/JP10/61137 Filed Jun. 30, 2010.

* cited by examiner

*Primary Examiner* — George Eng
*Assistant Examiner* — Inder Mehra
(74) *Attorney, Agent, or Firm* — Oblon, Spivak, McClelland, Maier & Neustadt, L.L.P.

(57) ABSTRACT

In a location identifying method, the sight of users of mobile communication terminals is estimated by calculating directions of the users based on position information of the mobile communication terminals, and the location where the lines of sight of the users are concentrated is identified based on the estimated sight. By identifying a location where the lines of sight of the users of the mobile communication terminals are concentrated, it is possible to identify an installation location where high advertising effectiveness can be achieved. Moreover, since only acquisition of the position information of the mobile communication terminals is needed, it is possible to efficiently identify an installation location of an advertisement, etc. Therefore, it is possible to efficiently identify an installation location of an advertisement or a billboard where high advertising effectiveness can be achieved.

8 Claims, 12 Drawing Sheets

*Fig.4*

| POINT_ID | USER_ID | LATITUDE | LONGITUDE | DATE AND TIME | TRAFFIC MODE |
|---|---|---|---|---|---|
| 1 | a | 35.1234567890 | 135.1234567890 | 2009/5/20 14:00:00 | ON FOOT |
| 2 | a | 35.1234567890 | 135.1234567891 | 2009/5/20 14:00:01 | ON FOOT |
| 3 | b | 40.1234567890 | 135.1234567890 | 2009/5/20 14:00:01 | CAR |
| 4 | b | 40.1234567891 | 135.1234567892 | 2009/5/20 14:00:02 | CAR |
| 5 | c | 36.1234567891 | 135.1234567892 | 2009/5/20 15:00:00 | TRAIN |
| ... | ... | ... | ... | ... | ... |

*Fig.7*

| USER_ID | NAME | GENDER | DATE OF BIRTH |
|---|---|---|---|
| a | ICHIRO SATO | MAN | 1980/11/20 |
| b | JIRO YAMADA | MAN | 1965/1/8 |
| c | HANAKO SUZUKI | WOMAN | 1977/8/8 |
| ⋮ | ⋮ | ⋮ | ⋮ |

Fig.8
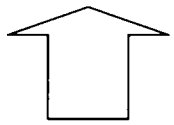
| SIDE FACE_ID | SIDE FACE LENGTH | COUNTED NUMBER |
|---|---|---|
| 1 | 5.0 | 1 |
| 2 | 5.0 | 2 |
| 3 | 5.0 | 0 |
| ... | ... | ... |
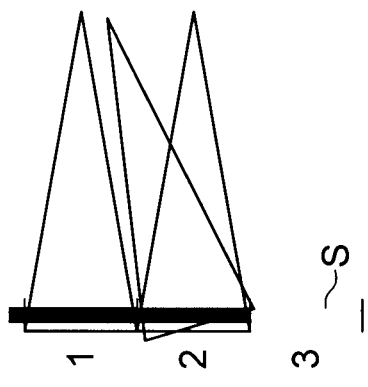

*Fig.12*

| POINT_ID | DIRECTION |
|---|---|
| 1 | 90 |
| 2 | 90 |
| 3 | 60 |
| 4 | 60 |
| 5 | 0 |
| ⋮ | ⋮ |

LOCATION IDENTIFYING METHOD AND LOCATION IDENTIFYING DEVICE

TECHNICAL FIELD

The present invention relates to a location identifying method and a location identifying device.

BACKGROUND ART

For installing an advertisement or a billboard in streets, buildings, etc., a location (a position) where advertising effectiveness is high is preferable. Examples of a location where advertising effectiveness is high include locations where many people pass by and that come into sight of pedestrians and drivers. One of the conventional methods for setting such an installation location is a method in which the traffic of people or cars is measured and a location with much traffic is identified as an installation location.

In the method described in Patent Literature 1, for example, people passing in front of an existing advertising billboard are imaged with a camera and the attributes are analyzed based on the imaged people, so as to identify which advertising billboard of which area or location is effective for an advertiser to place an advertisement on.

CITATION LIST

Patent Literature

Patent Literature 1: Japanese Patent Application Laid-Open Publication No. 2007-293544

SUMMARY OF INVENTION

Technical Problem

However, a location where there is much traffic of people or cars is not a site where advertising effectiveness is always high. For example, even if a location is with much traffic, when an advertisement is placed on a side wall, etc. along the moving directions of people or cars, it is difficult that the advertisement comes into sight of people and thus high advertising effectiveness cannot be expected.

In the method described in the above Patent Literature 1, one can select only preliminarily-installed advertising billboards, and it is necessary to set a camera at each advertising billboard, which is not efficient.

The invention is made in order to solve the above problems and directed at providing a location identifying method and a location identifying device that can efficiently identify an installation location of an advertisement or a billboard where high advertising effectiveness can be achieved.

Solution to Problem

In order to solve the above problems, a location identifying method according to the present invention is a location identifying method for obtaining position information of mobile communication terminals and identifying a location where lines of sight of users having the mobile communication terminals are concentrated. The location identifying method includes: a direction calculating step of, by direction calculating means, calculating directions of users of the mobile communication terminals based on the position information of the mobile communication terminals; a sight estimating step of, by sight estimating means, estimating the sight of the users based on the directions of the users of the mobile communication terminals calculated in the direction calculating step; and a location identifying step of, by location identifying means, identifying a location where the lines of sight of the users are concentrated based on multiplicity of the sight of the users estimated in the sight estimating step with a predetermined boundary.

In the location identifying method of the present invention, the sight of the users of the mobile communication terminals is estimated by calculating the directions of the users based on the position information of the mobile communication terminals, and the location where the lines of sight of the users are concentrated is identified based on the estimated sight. Today, there are a significant number of users who have mobile communication terminals. Therefore, when a location frequently coming into the sight of users who have mobile communication terminals, that is, a location where the lines of sight are concentrated is set as an installation location of an advertisement, etc., high advertising effectiveness can be expected. Then, by estimating the sight of the users of the mobile communication terminals and identifying a location where the lines of sight are concentrated based on the multiplicity of the sight of the users with a predetermined boundary, it is possible to sufficiently secure the reliability as compared with a method based on the traffic amount, etc. and to identify an installation location where high advertising effectiveness can be achieved. Moreover, since only the acquisition of the position information of the mobile communication terminals is needed, it is possible to efficiently identify an installation location of an advertisement, etc. as compared with the street survey or cases in which a camera or other equipment is used, for example. Therefore, it is possible to efficiently identify an installation location of an advertisement or a billboard where high advertising effectiveness can be achieved.

In the location identifying step, it is preferable to weight a location where the lines of sight are concentrated based on attribute information of the users. The targets to whom advertising effectiveness of an advertisement or a billboard is expected vary depending on published contents. Then, by weighting a location where the lines of sight are concentrated based on attribute information such as ages, for example, it is possible to identify an installation location of an advertisement, etc. according to the targets.

In the sight estimating step, it is preferable to correct the sight based on the attribute information of the users. The sight may vary depending on ages. Then, by correcting the sight based on attribute information, through the narrowing of the sight angle for old people, for example, it is possible to estimate the appropriate sight for each user of the mobile communication terminals.

In the direction calculating step, it is preferable to correct the directions of the users of the mobile communication terminals in accordance with traveling conditions of the users. For example, when a user of a mobile communication terminal is on a train, it is often the case that the user faces sideways relative to the moving direction of the train. Then, by correcting the direction of the user in accordance with the traveling conditions, it is possible to appropriately calculate the direction of the user.

In the sight estimating step, it is preferable to correct the sight based on traveling velocity of the mobile communication terminals. When the traveling velocity is high, the sight is narrow as compared with a case where the traveling velocity is low. Therefore, by correcting the sight based on the traveling velocity, it is possible to estimate the appropriate sight for each user of the mobile communication terminals.

In the location identifying step, it is preferable to identify a location where the lines of sight of the users are concentrated by counting how many times the sight of the users crosses with side faces of a building divided in a given length. In such a case, it is possible to identify more accurately a location where the lines of sight of the users are concentrated.

In the location identifying step, it is preferable to identify a location where the lines of sight of the users are concentrated by counting how many times the sight of the users crosses with side faces of the building divided based on vertices at which the sight of the users and the building cross. In such a case, it is possible to identify more accurately a location where the lines of sight of the users are concentrated.

The invention can be described as an invention of a location identifying method as described above. In addition, it can be also described as an invention of a location identifying device as follows. While they fall under different categories, they are substantially the same invention, exerting the same actions and effects.

In other words, a location identifying device of the present invention is a location identifying device that obtains position information of mobile communication terminals and identifies a location where lines of sight of users having mobile communication terminals are concentrated. The location identifying device includes: direction calculating means for calculating directions of the users of the mobile communication terminals based on the position information of the mobile communication terminals; sight estimating means for estimating the sight of the users based on directions of the users of the mobile communication terminals calculated by the direction calculating means; and location identifying means for identifying a location where the lines of sight of the users are concentrated based on multiplicity of the sight of the users estimated by the sight estimating means with a predetermined boundary.

Advantageous Effects of Invention

According to the present invention, it is possible to efficiently identify an installation location of an advertisement or a billboard where high advertising effectiveness can be achieved.

BRIEF DESCRIPTION OF DRAWINGS

FIG. 4 is a diagram showing an example of position information stored.

FIG. 7 is a diagram showing an example of user attribute information stored.

FIG. 8 is a diagram for explaining a process performed in the location specifying module.

FIG. 12 is a diagram showing an example of the direction information storing format in the sight estimating module.

DESCRIPTION OF EMBODIMENTS

In the following, with reference to the enclosed drawings, a preferable embodiment of the location identifying method and the location identifying device of the present invention will be described. In the explanation of the drawings, the identical reference signs are given to the identical elements, and repeated explanation is omitted.

The location identifying method of the embodiment is implemented by a location identifying device. The location identifying device is a device that identifies a location where the lines of sight of users having mobile communication terminals are concentrated based on position information of the mobile communication terminal (mobile phone) obtained by a communication system and provides information of the location. Then, the communication system will be described firstly.

Figure 1:
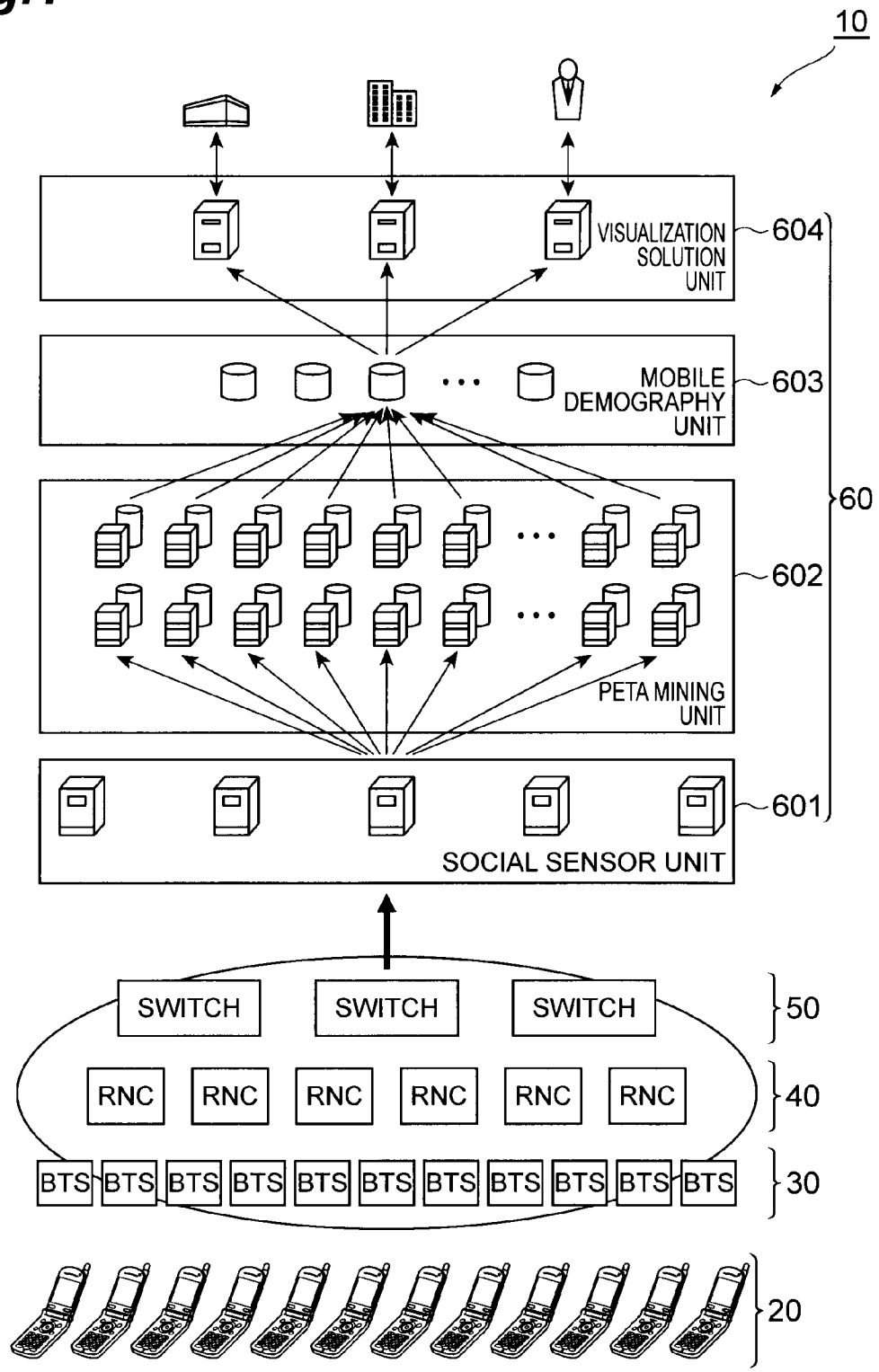
FIG. 1 is a schematic diagram showing a communication system.

FIG. 1 is a schematic diagram showing a communication system. As the diagram shows, a communication system 10 is composed with mobile communication terminals 20, BTSs (base transceiver stations) 30, RNCs (radio network controllers) 40, switches 50, and a management center 60. The management center 60 is composed with a social sensor unit 601, a peta-mining unit 602, a mobile demography unit 603, and a visualization solution unit 604.

The switches 50 collect position information of the mobile communication terminal 20 via the BTSs 30 and the RNCs 40. When the RNCs 40 are in communication connection with the mobile communication terminals 20, they can measure the position of the mobile communication terminals 20 with the use of a delay value of RRC connection request signals. The switches 50 can receive the position information of a mobile communication terminal 20 that has been thus measured, when the mobile communication terminal 20 performs communication connection. The switches 50 store the received position information and output the collected position information to the management center 60 at given timing or in response to a request from the management center 60. Here, generally, approximately one thousand RNCs 40 are placed throughout Japan. Meanwhile, approximately three hundred switches 50 are placed in Japan.

The management center 60 is composed with the social sensor unit 601, the peta-mining unit 602, the mobile demography unit 603, and the visualization solution unit 604, as described above, and each unit performs statistical processing using position information of the mobile communication terminal 20.

Each of the social sensor units 601 is a server device collecting data including position information of the mobile communication terminal 20 from each switch 50. The social sensor unit 601 is arranged so as to receive data output regularly from the switch 50 or to request the switch 50 to transmit data according to timing predetermined by the social sensor unit 601.

Each of the peta-mining unit 602 is a server device converting data received from the social sensor unit 601 into a given data format. For example, the peta-mining unit 602 performs sorting processing with a user ID as a key or sorting processing for each area.

Each of the mobile demography unit 603 is a server device performing totalization processing for data having been processed in the peta-mining unit 602, that is, counting processing of each item. For example, the mobile demography unit 603 can count the number of users who are in an area or total the existence distribution.

Each of the visualization solution unit 604 is a server device processing data subjected to totalization processing in the mobile demography unit 603 into visible. The data processed in the visualization solution unit 604 is provided in response to a request from a communication terminal (not shown), for example, such as a personal computer, a mobile phone, or a PDA that a user such as an enterprise, a government office or an individual own.

Figure 2:
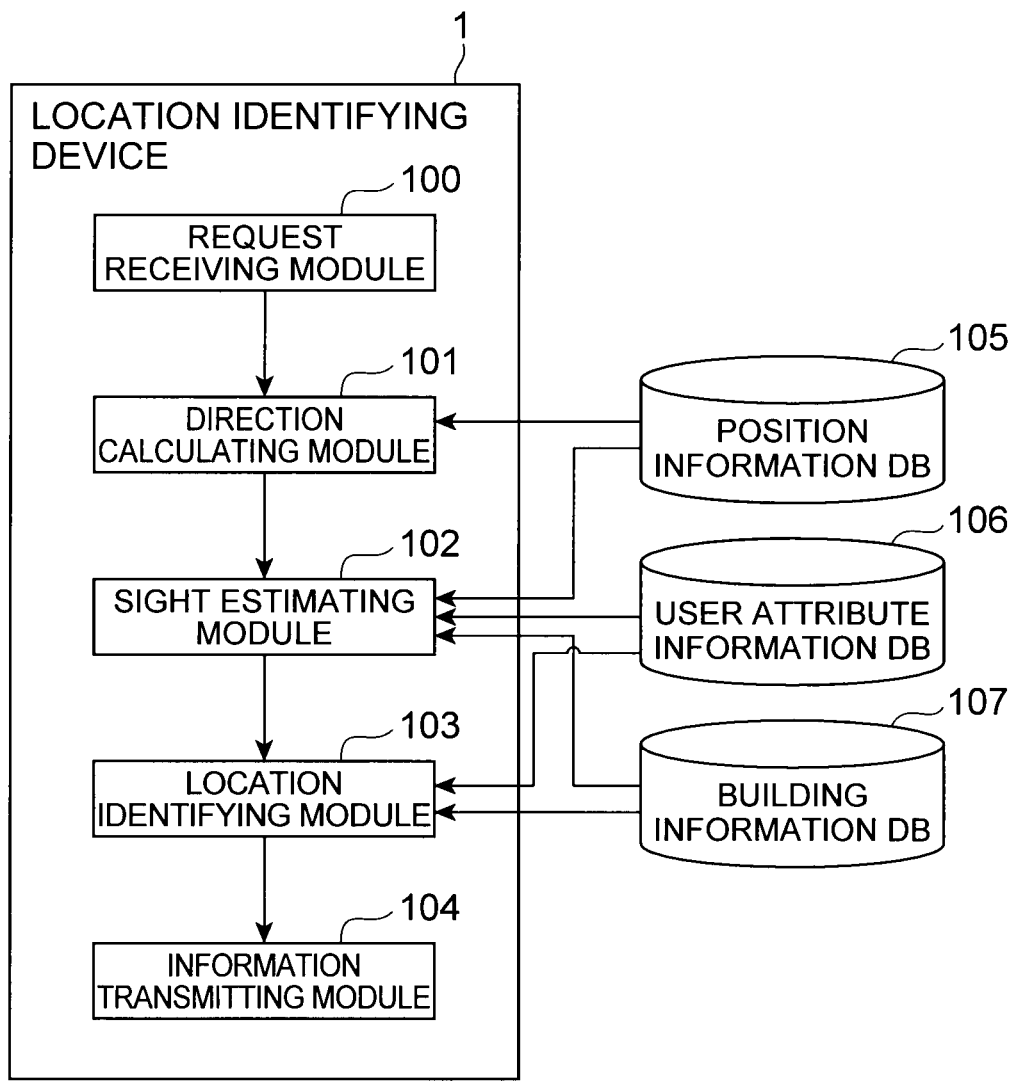
FIG. 2 is a block diagram showing a location identifying device.

Subsequently, the location identifying device will be described in detail. FIG. 2 is a block diagram showing a location identifying device of one embodiment of the present invention. A location identifying device 1 shown in the diagram is a device that identifies a location where the lines of sight of users having the mobile communication terminal 20 are concentrated and provides information of the location to users (advertisers) who are looking for an installation location of an advertisement or a billboard. The location identifying device 1 corresponds to a server device constituting the visualization solution unit 604. The location identifying device 1 may be constituted by a single server device or may be constituted by a plurality of server devices.

Figure 3:
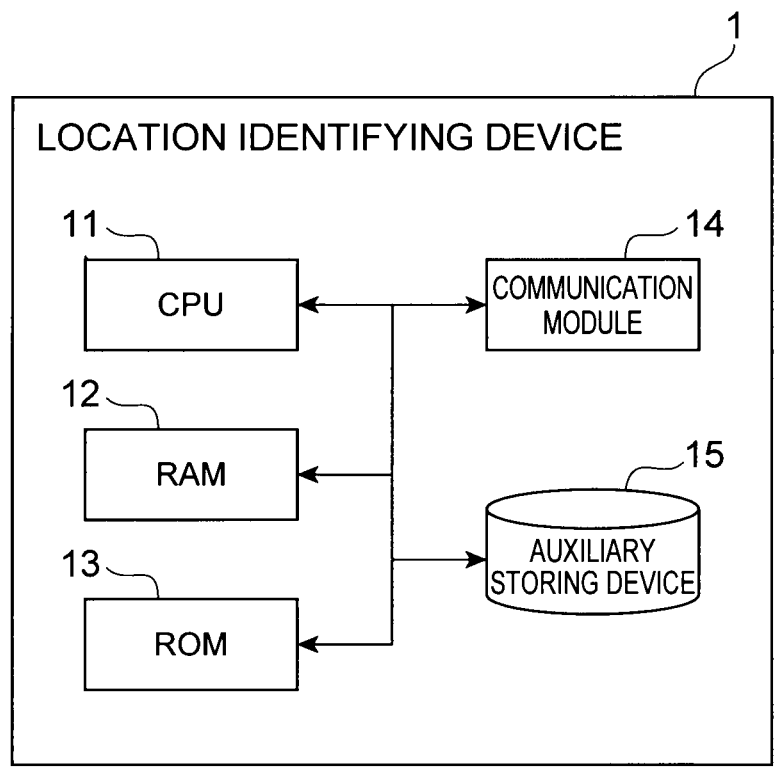
FIG. 3 is a diagram showing a hardware configuration of the location identifying device.

FIG. 3 is a diagram showing a hardware configuration of the location identifying device 1. As FIG. 3 shows, the location identifying device 1 is arranged as a computer having CPU 11, RAM 12 and ROM 13 that are as main storing devices, a communication module 14 that is a data transmitting-receiving device such as a network card, and hardware such as a hard disc serving as an auxiliary storing device 15. These components operate, and thus the functions of the location identifying device 1 that are described later are turned on. The server devices constituting the social sensor unit 601, the peta-mining unit 602 and the mobile demography unit 603 also have the same configuration as the location identifying device 1.

Returning to FIG. 2, the location identifying device 1 has a request receiving module 100, a direction calculating module (direction calculating unit) 101, a sight estimating module (sight estimating unit) 102, a location identifying module (location identifying unit) 103, and an information transmitting module 104.

The request receiving module 100 is a portion that receives request information sent from a communication terminal of a user. The request information is information for requesting the provision of information of a location recommended as an installation location if the user places an advertisement or a billboard, and includes information indicating areas or requirements that the user desires. The request receiving module 100 outputs the received request information to the direction calculating module 101 and the location identifying module 103.

The direction calculating module 101 is a portion that calculates the direction of a user having the mobile communication terminal 20 based on position information of the mobile communication terminal 20. Specifically, the direction calculating module 101 receives the request information output from the request receiving module 100, then obtains the position information of the mobile communication terminal 20 that has been obtained by the communication system 10 and is stored in a position information DB (data base) 105, and calculates the direction of the user of the mobile communication terminal 20. The position information DB 105 is maintained at a server device of the visualization solution unit 604, for example.

Here, position information stored in the position information DB 105 will be described. FIG. 4 is a diagram showing an example of position information stored. As the diagram shows, in the table of position information, a "point ID" that is the unique number of each position information, a "user ID" that can be linked with user attribute information (described later), a "latitude" in the obtained position information, a "longitude" in the obtained position information, "date and time (date, hour, minute, and second)" at which position information has been obtained, and a "traffic mode" indicating the travel means of a user, are mapped and stored. The traffic mode is set by a user of the mobile communication terminal 20 and categorized to three types of "on foot", "car" and "train".

The direction calculating module 101 obtains the position information of the mobile communication terminal 20 from the position information DB 105, puts the position information for each unique user in the chronological order, and calculates the direction of the user based on adjacent position information. The direction of the user means a direction to which the user having the mobile communication terminal 20 will move (the moving direction of the mobile communication terminal 20) (see the arrows of FIG. 9). The calculated direction information indicating the direction of the user is stored in the direction calculating module 101 in a format described later. The direction calculating module 101 outputs the calculated direction information indicating the direction of the user to the sight estimating module 102.

Figure 12:
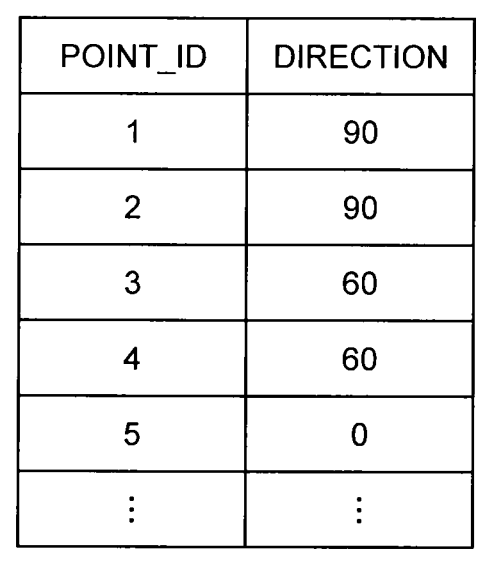

Here, the above direction information storing format in the sight estimating module 102 will be described. FIG. 12 is a diagram showing an example of the direction information storing format in the sight estimating module 102. As the diagram shows, in the direction information storing table of the sight estimating module 102, a "point ID" that is the unique number of each position information and a "direction", expressed in the geographical rotation format, to which a user faces at each point are stored in association with each other. It should be noted that the geographical rotation format is a format that indicates a direction to which a user faces as an angle by setting the direction directly above in a map in which the position of a user is shown (that is, of north as an example) as 0° and increasing an angle in the clockwise direction with the position of the user as a center.

The direction calculating module 101 corrects the direction of the user of the mobile communication terminal 20 according to traveling conditions of the user. Specifically, when the "traffic mode" indicates "train" in position information, the direction calculating module 101 rotates the direction of the user by approximately 90° relative to the moving direction (the moving direction of the train). The rotation direction here may be either clockwise or counterclockwise. When having corrected the direction of the user, the direction calculating module 101 outputs direction information combined with the correction information indicating that the correction has been made to the sight estimating module 102. When the time interval of position information is large, the direction calculating module 101 may complement data based on the shape of a road at which the mobile communication terminal 20 is positioned and correct the direction of the user.

The sight estimating module 102 is a module that estimates the sight of the user. The sight estimating module 102 receives the direction information output from the direction calculating module 101, and then estimates the sight of the user based on the direction information and building information. The building information is preliminarily-stored information of the shapes of buildings (buildings and houses, for example)

that exist in a map, and is stored in a building information DB 106 (see FIG. 2) in a server device of the visualization solution unit 604, for example.

Figure 5:
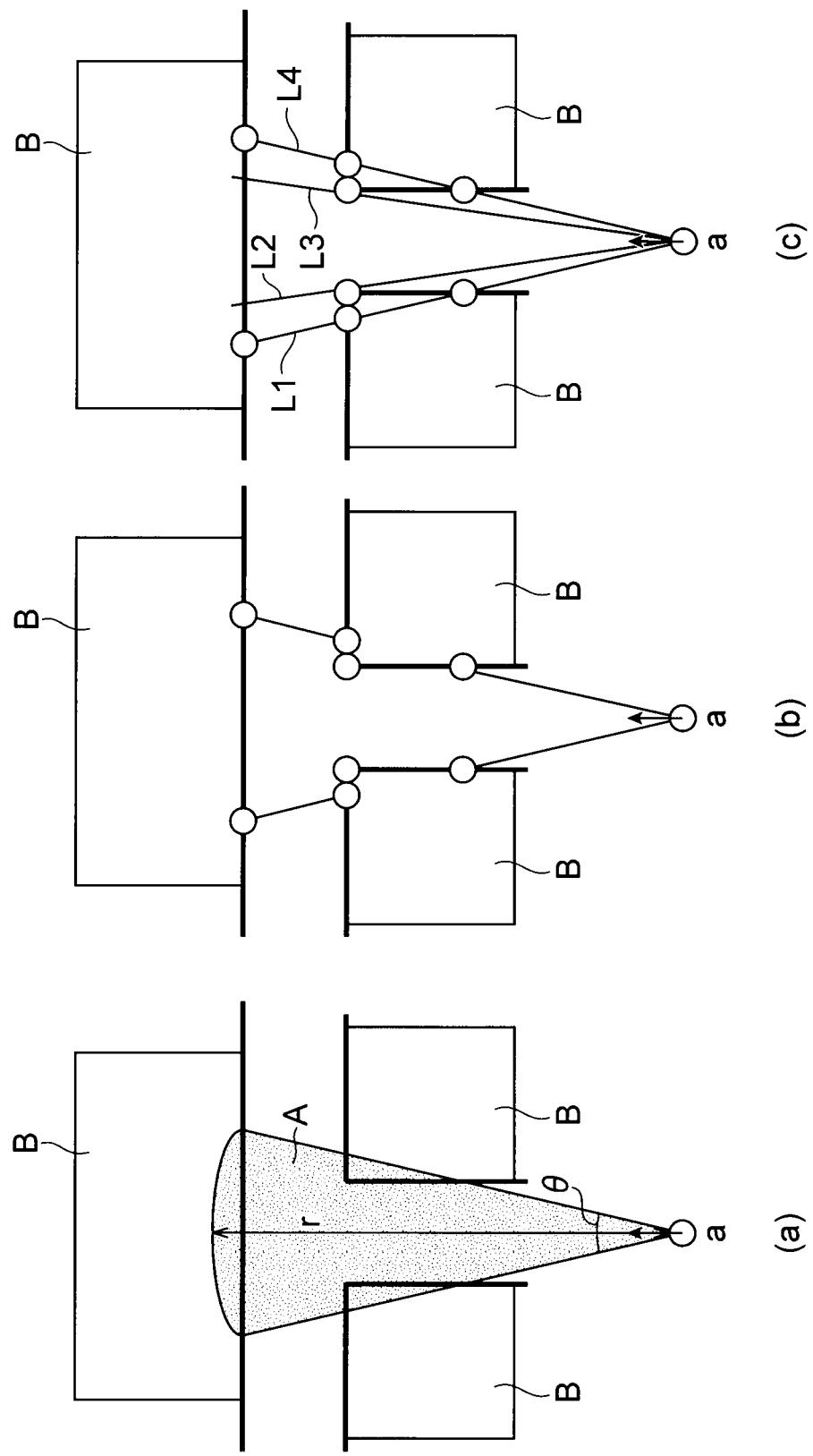
FIG. 5 is a diagram for explaining a sight estimating method.
Figure 6:
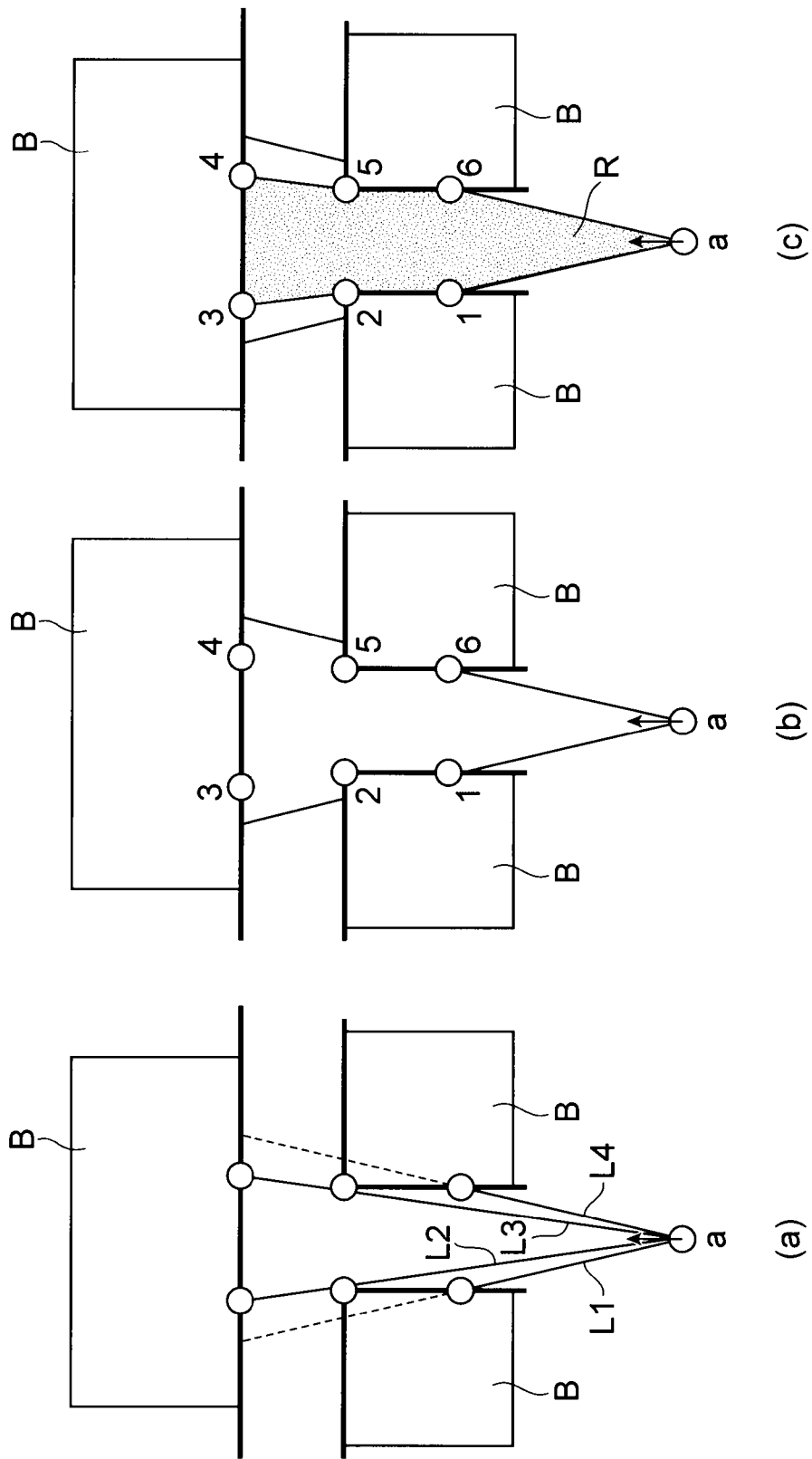
FIG. 6 is a diagram for explaining a sight estimating method.

The method of estimating the sight of the user of the mobile communication terminal 20 in the sight estimating module 102 will be described in detail with reference to FIG. 5 and FIG. 6. FIG. 5 and FIG. 6 are diagrams for explaining the sight estimating method. In FIG. 5 and FIG. 6, a case where the user of the mobile communication terminal 20 is positioned at a T-junction is shown.

Firstly, as FIG. 5(*a*) shows, the sight estimating module 102 generates, based on the direction information, a sight range-A that has a fan shape with an angle θ of 35° and a radius-r of 20 m, for example, with the position-a of the user as a center in the direction to which the user faces (the direction of the arrow). Next, as FIG. 5(*b*) shows, the sight estimating module 102 removes portions of the sight range-A that a buildings B overlaps, and marks each vertex (except for the position-a) of the sight range-A from which the overlapped portions have been removed. Then, as FIG. 5(*c*) shows, the sight estimating module 102 generates lines L1 to L4 having the same distance as the radius of the fan shape (20 m) from the position-a as a starting point and passing all vertices marked.

Subsequently, as FIG. 6(*a*) shows, the sight estimating module 102 divides the generated lines L1 to L4 at points at which each of the lines crosses with the building B first (two vertices of the building B that are in the middle of FIG. 6(*a*) are not points at which the lines cross but tangent points, and thus they are excluded), removes lines that do not have a vertex of the position-a of the user (the dashed line portions of FIG. 6(*a*), that is, the portions that cannot be visually reached from the position-a of the user because of the building B), and marks points at which the lines L1 to L4 from which the above portions have been removed and the building B cross and contact. Then, the sight estimating module 102 searches on the sides of the sight range-A generated in FIG. 5(*b*) in the clockwise direction with the position-a as a starting point, and puts the numbers (1 to 6) for the vertices marked in FIG. 6(*a*) in the order of finding them, as shown in FIG. 6(*b*). Finally, as FIG. 6(*c*) shows, the sight estimating module 102 connects the vertices in the order of the number put in FIG. 6(*b*), and estimates a range-R defined by connecting the vertices in the order of the number as the sight of the user who is at the position-a. In the above way, the sight estimating module 102 estimates the sight of the user at the potion-a.

The sight estimating module 102 corrects the sight of the user based on attribute information of the user of the mobile communication terminal 20. Specifically, the sight estimating module 102 obtains attribute information regarding to the age of the user by refereeing to the user attribute information DB 107 (see FIG. 2) and corrects the sight based on the attribute information. The user attribute information DB 107 is maintained by a server device of the visualization solution unit 604, for example.

Here, the attribute information stored in the user attribute information DB 107 will be described. FIG. 7 is a diagram showing an example of attribute information stored. As the diagram shows, in the table of attribute information, a "user attribute ID" distinguishing attribute information and being linked with a user ID, a "name" of a contractor, a "gender" of a contractor, and a "date of birth" of a contractor, are stored in association with each other. In the user attribute information DB 107, furthermore, a variety of information of the user of the terminal communication terminal 20 is also stored.

The sight estimating module 102 obtains attribute information regarding to the age by referring to the above user attribute information DB 107 and judges whether the age that the obtained attribute information indicates exceeds a given age. Then, when the age that the attribute information indicates exceeds the given age, the sight estimating module 102 makes the radius-r of the sight range-A shorter than 20 m and sets the angle θ to be smaller than 35°, then estimating the sight of the user of the mobile communication terminal 20 by the above method.

The sight estimating module 102 corrects the sight of the user based on the traveling velocity of the user of the mobile communication terminal 20. Specifically, the sight estimating module 102 obtains a "latitude", a "longitude" and "date and time" by referring to the position information DB 105, and calculates the traveling velocity of the mobile communication terminal 20 based on such information. Then, when the calculated traveling velocity of the mobile communication terminal 20 is higher than a predetermined given velocity, the sight estimating module 102 sets the angle θ of the sight range-A to be smaller than 35° and estimates the sight of the user of the mobile communication terminal 20 by the above method. The sight estimating module 102 outputs the sight information indicating the sight of the user estimated in the above way to the location identifying module 103.

The location identifying module 103 is a module that identifies a location where the lines of sight of users of the mobile communication terminal 20 are concentrated. The location identifying module 103 receives the request information output from the request receiving module 100 and the sight information output from the sight estimating module 102, and then identifies a location where the lines of sight of users of the mobile communication terminal 20 are concentrated based on the request information, the sight information and the building information. The process performed by the location identifying module 103 will be described with reference to FIG. 8.

The location identifying module 103 extracts building information regarding to the shapes of buildings that exist in an area (location) that the user desires from the building information DB 106 based on the request information. Next, the location identifying module 103 divides a side face (a predetermined boundary) S of a building to a certain unit at given intervals (5.0 m in the embodiment) based on the extracted building information, and puts a side face ID for each of divided side face S, as FIG. 8 shows. Then, the location identifying module 103 counts the number of crosses of the side face S with sight based on the sight information and records the counted number for each side face ID. In other words, in FIG. 8, the number of crosses of the side face of the side face ID 1 with sight is "1", the number of crosses of the side face of the side face ID 2 with sight is "2", and the number of crosses of the side face of the side face ID 3 with sight is "0".

Here, in FIG. 8, the sight indicated by triangular shapes is shown in a way that it overlaps the side face S and coexists therewith. However, the portion at which the side face S and sight cross (that is, the portion as line segments along the surface of the side face S in FIG. 8) is an actual part of the sight, and the location identifying module 103 counts the number of such crosses. As described later with the use of FIG. 11, when the display is color-coded in accordance with the amount of the counted number so that the amount is recognized visually, in order to ease recognition of the color, the side face S actually indicated by a line segment is shown in a way that it has a width in FIG. 8 for convenience.

When any condition is set in request information, the location identifying module 103 performs weighting based on attribute information. Specifically, when "twenties" and "man" are included in request information as conditions, for example, the location identifying module 103 sets the count value for cases in which the side face and sight of the user fulfilling the conditions are crossed based on attribute information, not to 1 but to 1.5, for example. It is also possible to set the count value of users not fulfilling the conditions to 0.5, for example, and the count value of users fulfilling the conditions to 1. When the sight is estimated based on direction information to which correction information has been added in the direction estimating module 101, the location identifying module 103 sets the count value not to 1 but to 0.5, for example, thus reducing weighting.

Figure 9:
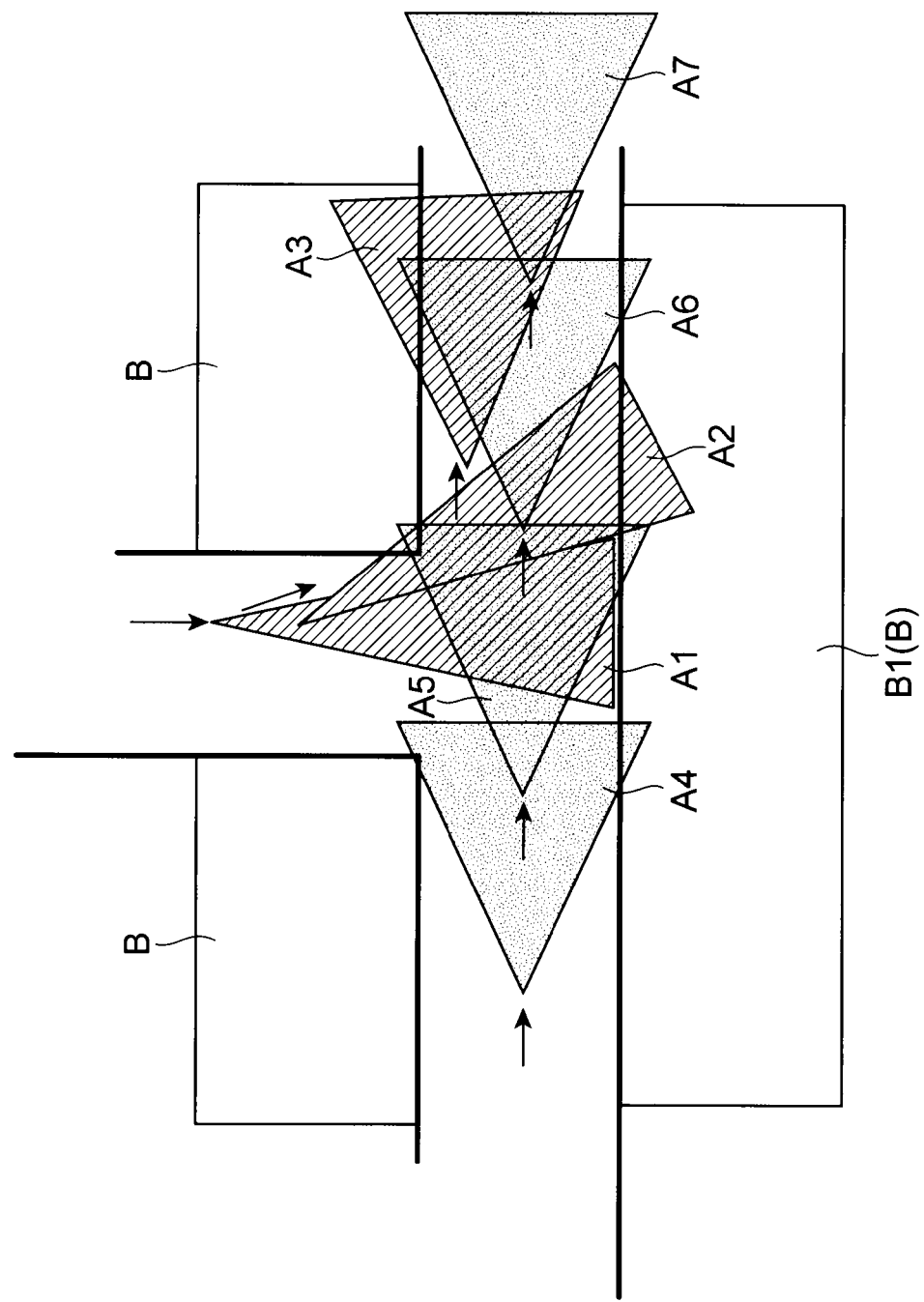
FIG. 9 is a diagram showing the relation between sight and side faces.

When the sight of the user is parallel to the side face of a building (assumed as B1) that is a target for consideration whether it is a location where the lines of sight are concentrated, that is, when the user faces to a direction along the side face of the building B1 as FIG. 9 shows, the location identifying module 103 reduces weighting. In other words, as FIG. 9 shows, the normal weighting (count value 1, for example) is applied to the sight ranges A1 and A2 (since they are not in the direction along the side face of the building B1) and the weighing is reduced regarding to the sight ranges A3 to A7 (since they are in the direction along the side face of the building B1). The location identifying module 103 identifies a location where the lines of sight of the users are concentrated based on the counted number obtained in the above way and outputs identified location information indicating the identification of a location to the information transmitting module 104.

The information transmitting module 104 transmits various information to the communication terminal of a user. The information transmitting module 104 transmits identified location information output from the location identifying module 103 to the communication terminal.

Figure 10:
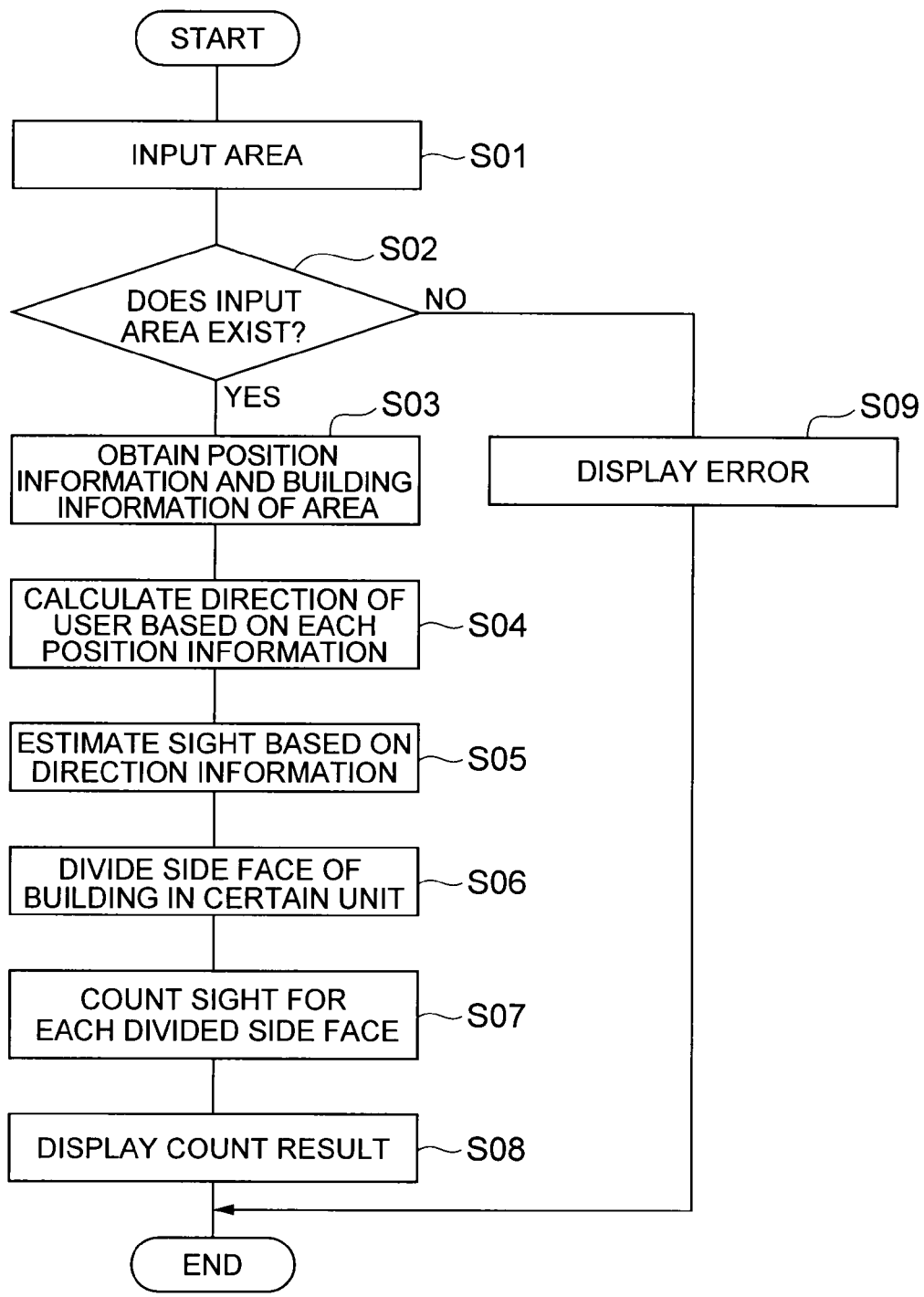
FIG. 10 is a flowchart showing a sequential flow of providing identified location information.

Subsequently, the providing method of the identified location information, that is, the information of an installation location of an advertisement or a billboard will be described with reference to FIG. 10. FIG. 10 is a flowchart showing a sequential flow of providing identified location information. In FIG. 10, the correction of a variety of information based on user attribute information is not performed.

As FIG. 10 shows, firstly, an area at which a user who is an advertiser desires to place an advertisement or a billboard is input in a communication terminal (Step S01) by the user, and the request information including the input area is transmitted to the location identifying device 1. Then, in the location identifying device 1 having received the request information, it is judged whether the area input by the user exists or not (Step S02). When it is judged that the input area exists, the process proceeds to Step S03. On the other hand, when it is not judged that the input area exists, error information is transmitted to the communication terminal of the user to display as error (Step S09) and the process ends.

In Step S03, in the location identifying device 1, position information of each mobile communication terminal 20 and building information in the area that the user desires are obtained. Then, based on the obtained position information, the direction of the user of the mobile communication terminal 20 is calculated (Step S04). The direction of the user is calculated, and then the sight of the user is estimated based on the direction (Step S05).

Based on the obtained building information, the side face of a building in the applicable area is divided to a certain unit (Step S06). Then, the number of sight crossing each side face is counted (Step S08) and the count result is transmitted to the communication terminal of the user as identified location information. Then, on the communication terminal having received the identified location information from the location identifying device 1, the location identifying information is displayed (Step S08).

Figure 11:
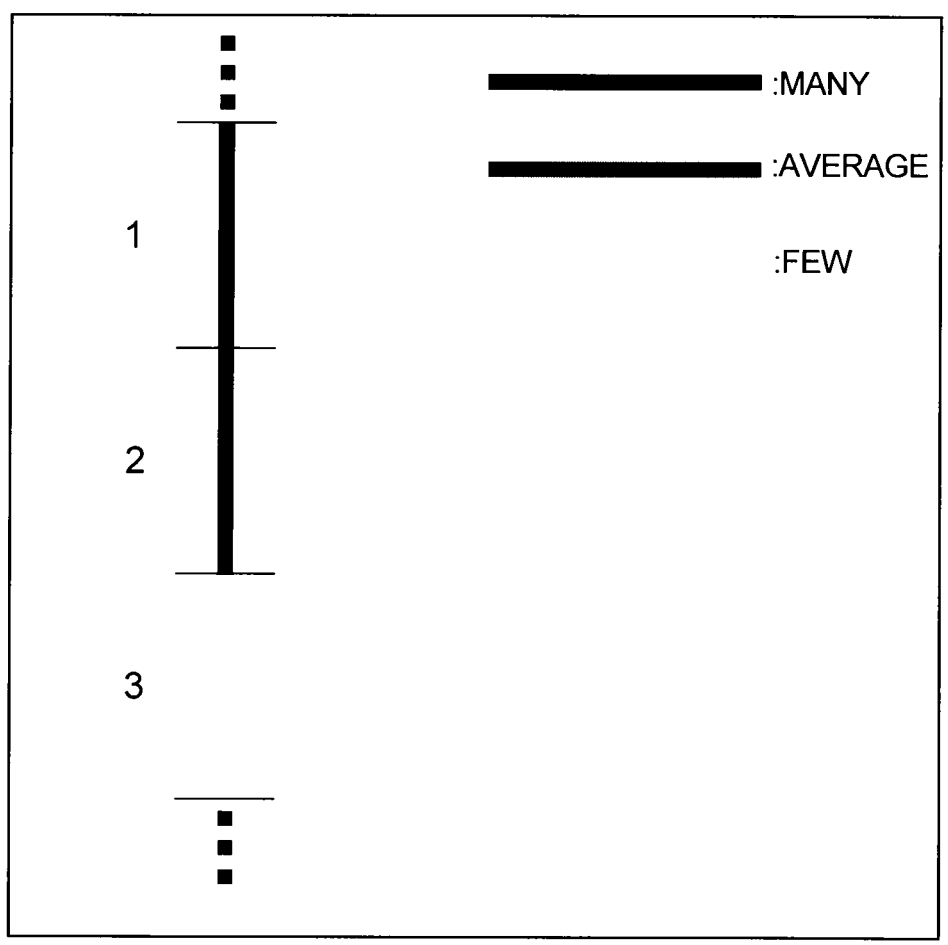
FIG. 11 is a diagram showing an example of location identifying information displayed on a communication terminal of a user.

FIG. 11 is a diagram showing an example of location identifying information displayed on a communication terminal of a user. As the diagram shows, on the display of the communication terminal, a figure in which the side face of a building is divided in a certain unit is displayed and the amount of counted number is of color-coded display for each side face according to the amount, that is, the concentration of the lines of sight of users of the mobile communication terminal 20. By such a display, the user can recognize at a glance a location where the lines of sight of users having the mobile communication terminal 20 are highly concentrated.

As described in the above, the location identifying device 1 estimates the sight of a user by calculating the direction of the user based on position information of the mobile communication terminal 20 and identifies a location where the lines of sight of users are concentrated. Today, there are a significant number of users who have mobile communication terminals 20. Therefore, when a location frequently coming into the sight of users who have the mobile communication terminals 20, that is, a location where the lines of sight are concentrated is set as an installation location of an advertisement, etc., high advertising effectiveness can be expected. Then, by estimating the sight of the user of the mobile communication terminal 20 and identifying a location where the lines of sight are concentrated based on the multiplicity of the sight of the user with a predetermined boundary, it is possible to sufficiently secure the reliability as compared with a method based on the traffic amount, etc. and identify an installation location where high advertising effectiveness can be achieved. Moreover, since only the acquisition of position information of the mobile communication terminals 20 is needed, it is possible to efficiently identify an installation location of an advertisement, etc. as compared with the street survey or cases in which a camera or other equipment is used, for example. Therefore, it is possible to efficiently identify an installation location of an advertisement or a billboard where high advertising effectiveness can be achieved.

In the location identifying module 103, a location where the lines of sight are concentrated is weighted based on attribute information of the user of the mobile communication terminal 20. The targets to whom advertising effectiveness of an advertisement or a billboard is expected vary depending on published contents. Then, by weighting men in their twenties as targets, for example, based on user attribute information, it is possible to appropriately identify an installation location of an advertisement for men in their twenties as the targets.

In the sight identifying module 102, the sight is corrected based on attribute information of the user of the mobile communication terminal 20. The sight varies depending on ages, and there is a tendency that the sight gets narrower as one is older. Then, by correcting the sight based on user attribute information, through the narrowing of the angle for old people, for example, it is possible to estimate the appropriate sight for each user.

In the sight estimating module 102, it is preferable to correct the sight based on the traveling velocity of the mobile communication terminal 20. When the traveling velocity is high, the sight is narrow as compared with a case where the traveling velocity is low. Therefore, by correcting the sight based on the traveling velocity, it is possible to estimate the appropriate sight for each user.

In the location identifying module 103, a location where the lines of sight of users are concentrated is identified by counting (totalizing) the number of crosses of the sight of users of the mobile communication terminal 20 with side faces of a building divided in a certain unit. In such a case, it is possible to identify more accurately a location where the lines of sight of users are concentrated.

The invention is not limited to the above embodiment. For example, in the above embodiment, the radius-r of the fan shape of the sight range-A is set to 20 m and the angle θ thereof is set to 35°. However, the radius-r and the angle θ may be appropriately changed.

In the above embodiment, in the sight estimating module 102, the angle θ is set to be smaller than 35° when the age exceeds a given age. However, the angle θ may be set so that it becomes smaller as the age advances (in proportion to the age). Moreover, in the sight estimating module 102, the angle θ is set to be smaller than 35° when the velocity exceeds a given one. However, the angle θ may be set so that it becomes smaller as the velocity gets higher (in proportion to the velocity).

In the above embodiment, the location identifying module 103 divides the side face of the building in a certain unit at given intervals. However, it may divide the side face of the building based on the vertices of the sight of the user. Specifically, as FIG. 6(c) shows, the location identifying module 103 divides, regarding to the vertices 1 to 6 at which the sight of the user estimated by the sight estimating module 102 and the building B cross, the side face of the building B corresponding to portions between such vertices, to each portion therebetween (the portion 1 to 2, the portion 3 to 4, and the portion 5 to 6, for example). Then, the location identifying module 103 puts ID to thus divided side faces in the same manner as the method described above and identifies a location where the lines of sight are concentrated.

In the above embodiment, side faces of the building that exists on a map are targets as a location where the lines of sight of the users are concentrated. However, not only buildings but also vacant lots, etc. may be targets. In such a case, assuming the boundary with a road as a side face, a location where the lines of sight of the users having the mobile terminal 20 are concentrated is identified in the same manner as the above process. Therefore, it is possible to, supposing that a building is to be newly constructed at the vacant lot, set preliminarily an installation location of an advertisement or a billboard.

In the above embodiment, the sight of the user is set in two dimensions. However, adding information of the height to position information or building information, the sight of the user may be set in three dimensions.

In the above embodiment, the location identifying device 1 is used as a device for efficiently identifying an installation location of an advertisement or a billboard. However, in addition, it is also possible to use the location identifying device 1 as a device for efficiently selecting an installation location when installing a new store, one for efficiently selecting an installation location when installing a new vending machine, or one for efficiently selecting an installation location when installing a traffic sign.

The location identifying device 1 may be arranged so as to receive also inputs of a day of the week, hours or a season in which a user desires to place an advertisement or a billboard when an area in which the user desires to place an advertisement or a billboard is input to a communication terminal and to display the above specified location information taking account of the input day of the week, hours or season for the user. Regarding to the advertisement, for example, there are advertising media such as digital signage in which contents can be changed in a short term, or ones such as a poster or a billboard about which long-term publication is supposed. By considering such characters of advertising media and changing advertised contents according to input day of the week, hours or season, it is possible to further enhance advertising effectiveness.

In the situation of using advertising media in which contents can be changed in a short term, as an example, when the above advertising media are installed on a wall face as a side face that comes into sight of old people (60 years old or older) with a frequency more than a given rate during daytime hours (between 10 a.m. and 4 p.m.) and that comes into sight of young people (in their twenties) with a frequency more than a given rate during nighttime hours (between 4 p.m. and 10 p.m.), it can be supposed that the advertised contents are for old people during daytime hours and the contents are changed to ones for young people during nighttime hours.

As another example, when the above advertising media are installed on a wall face as a side face that comes into sight of women with a frequency more than a given rate from Monday to Friday and that comes into sight of men with a frequency more than a given rate on Saturday and Sunday, it can be supposed that the advertised contents are for women from Monday to Friday and the contents are changed to ones for men on Saturday and Sunday.

In the situation of using advertising media about which the long-term publication is supposed, as an example, since walking on a route under sunshade while avoiding the sunlight is generally preferred in summer and walking on an appreciation route for appreciating red leaves is generally preferred in autumn, it can be supposed that the above-described advertising media are installed in summer on a wall face as a side face that comes into sight relatively frequently when one walks on a sunshade route, and are installed in autumn on a wall face as a side face that comes into sight relatively frequently when one walks on an appreciation route.

INDUSTRIAL APPLICABILITY

According to the invention, it is possible to identify an installation location of an advertisement or a billboard where high advertising effectiveness is achieved.

REFERENCE SIGNS LIST

1 . . . location identifying device, 20 . . . mobile communication terminal, 101 . . . direction calculating module (direction calculating unit), 102 . . . sight estimating module (sight estimating unit), 103 . . . location identifying module (location identifying unit)

The invention claimed is:

1. A location identifying method for obtaining position information of mobile communication terminals and identifying a location where lines of sight of users having the mobile communication terminals are concentrated, the location identifying method comprising:

a direction calculating step of, by a direction calculating unit, calculating directions of the users of the mobile communication terminals based on the position information of the mobile communication terminals, the position information including a plurality of positions of each mobile communication terminal and time information for each of the plurality of positions;

a sight estimating step of, by a sight estimating unit, estimating a plurality of different line of sight measurements of the users based on the directions of the users of the mobile communication terminals calculated in the direction calculating step; and a location identifying step of, by a location identifying unit, identifying a location where the plurality of different line of sight measurements of the users are concentrated based on multiplicity of the different line of sight measurements estimated in the sight estimating step with a predetermined boundary, wherein the location identifying step identifies a location where the different line of sight measurements of the users are concentrated by counting how many of the different line of sight measurements of the users crosses with side faces of a building.

2. The location identifying method according to claim 1, wherein the location identifying step weights a location where the different line of sight measurements are concentrated based on attribute information of the users.

3. The location identifying method according to claim 2, wherein the sight estimating step corrects the different line of sight measurements based on the attribute information of the users.

4. The location identifying method according to claim 1, wherein the direction calculating step corrects the directions of the users of the mobile communication terminals in accordance with traveling conditions of the users.

5. The location identifying method according to claim 1, wherein the sight estimating step corrects the different line of sight measurements based on traveling velocity of the mobile communication terminals.

6. The location identifying method according to claim 1, wherein the location identifying step counts how many of the different line of sight measurements of the users crosses with side faces of a building divided in a given length.

7. The location identifying method according to claim 1, wherein the location identifying step counts how many of the different line of sight measurements of the users crosses with side faces of a building divided based on vertices at which the different line of sight measurements of the users and the building cross.

8. A location identifying device that obtains position information of mobile communication terminals and identifies a location where lines of sight of users having mobile communication terminals are concentrated, the location identifying device comprising:

a direction calculating unit calculating directions of the users of the mobile communication terminals based on the position information of the mobile communication terminals, the position information including a plurality of positions of each mobile communication terminal and time information for each of the plurality of positions;

a sight estimating unit estimating a plurality of different line of sight measurements of the users based on directions of the users of the mobile communication terminals calculated by the direction calculating unit; and a location identifying unit identifying a location where the plurality of different line of sight measurements of the users are concentrated based on multiplicity of the different line of sight measurements estimated by the sight estimating unit with a predetermined boundary, wherein the location identifying unit identifies a location where the different line of sight measurements of the users are concentrated by counting how many of the different line of sight measurements of the users crosses with side faces of a building.

* * * * *